United States Patent [19]

Kirkbir et al.

[11] Patent Number: 5,254,508
[45] Date of Patent: Oct. 19, 1993

[54] SOL-GEL PROCESS FOR FORMING A GERMANIA-DOPED SILICA GLASS ROD

[75] Inventors: Fikret Kirkbir, Newbury Park; Satyabrata Raychaudhuri, Westlake Village, both of Calif.

[73] Assignee: Yazaki Corporation, Tokyo, Japan

[21] Appl. No.: 806,036

[22] Filed: Dec. 12, 1991

[51] Int. Cl.$^5$ .......................... C03C 3/04; C03C 13/04
[52] U.S. Cl. .......................................... 501/12; 501/37; 65/3.11; 65/17; 65/18.1
[58] Field of Search .............. 501/12, 37; 65/17, 18.1, 65/3.11

[56] References Cited

U.S. PATENT DOCUMENTS

| | | | |
|---|---|---|---|
| 4,317,668 | 3/1982 | Susa et al. | 501/12 X |
| 4,426,216 | 1/1984 | Satoh et al. | 501/12 X |
| 4,477,580 | 10/1984 | Fleming, Jr. | 501/12 |
| 4,680,048 | 7/1987 | Motoki et al. | 501/12 X |
| 4,961,767 | 10/1990 | Shermerhorn et al. | 301/12 X |
| 5,023,208 | 6/1991 | Pope et al. | 501/12 |

*Primary Examiner*—Karl Group
*Attorney, Agent, or Firm*—Pretty, Schroeder, Brueggemann & Clark

[57] ABSTRACT

A sol-gel process for forming a germania-doped silica glass rod that is suitable for use as a preform in the manufacture of high numerical aperture optical fibers. The sol is produced by mixing together prescribed quantities of alkoxides including tetraethyl orthosilicate and tetraethyl orthogermanate, deionized water, ethanol and a precipitation catalyst such as hydrofluoric acid. Premature precipitation of germania is avoided by adding ethanol and deionized water to an alkoxide solution at a controlled, drop-wise rate and by then similarly adding the catalyst at a controlled, drop-wise rate. After drying the resulting gel, sintering is performed by chlorinating the dry gel to remove residual hydroxyl groups, then oxygenating the chlorinated gel to remove the chlorine, and finally heating the oxygenated gel in helium to a temperature of about 1300° C. Chlorinating and oxygenating the gel for extended time durations, and maintaining the gel above 1200° C. for less than 30 minutes, ensures that the final glass rod will not bubble when subsequently raised in temperature to 1800° C. during the final fiber draw step.

18 Claims, 2 Drawing Sheets

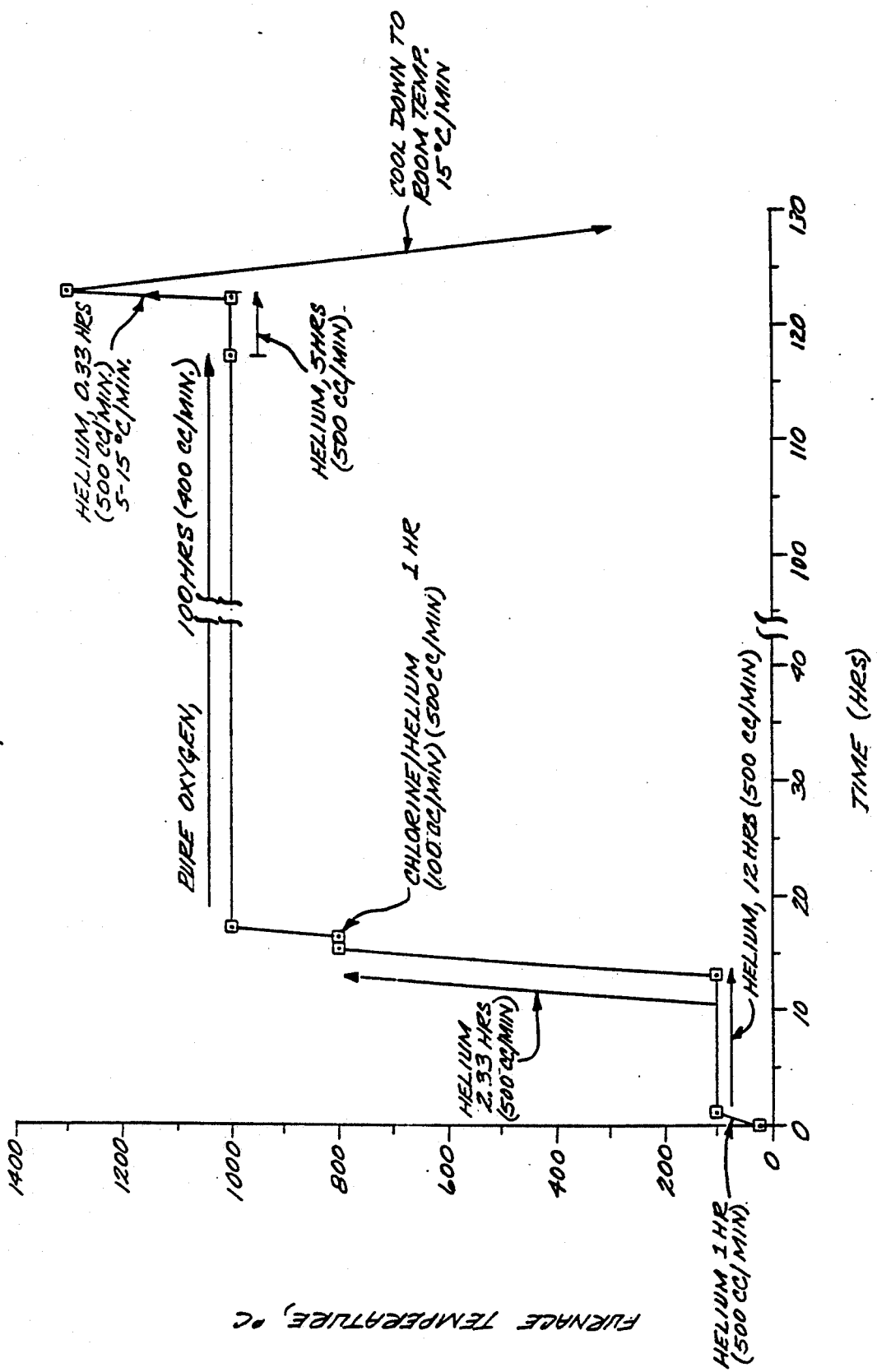

SOL-GEL PROCESS FOR FORMING A GERMANIA-DOPED SILICA GLASS ROD

BACKGROUND OF THE INVENTION

This invention relates generally to sol-gel processes for producing glass rods suitable for use in producing optical fibers and, more particularly, to such processes for producing glass rods that are doped with germanium dioxide, making the rods suitable for use in producing optical fibers of high numerical aperture.

One common family of processes for producing rods of this particular kind involves the vapor deposition of fine particles of silicon dioxide ($SiO_2$), or silica, and germanium dioxide ($GeO_2$), or germania. In one such process, called the outside vapor deposition (OVD) process, fine particles of silica and germania, often called soot particles, are deposited layer by layer on a horizontal, rotating mandrel. The deposition is performed at sufficiently high temperatures to partially sinter the particles and form a porous cylinder. A core of germania and silica is deposited first, followed by a pure silica cladding. At the conclusion of deposition, the mandrel is removed and the tube is sintered, or densified, at 1500° to 1600° C. to a dense glass rod, or preform.

A second vapor deposition process of this kind, called the vertical axial deposition (VAD) process, also forms a cylindrical body using soot particles, but deposition occurs from one end, or axially. The core and cladding are deposited simultaneously, using two torches. When complete, the cylindrical body is sintered to a dense glass rod, under conditions similar to those used in OVD process.

In a third vapor deposition process, called the modified chemical vapor deposition (MCVD) process, high-purity purity gas mixtures are injected into a rotating, high-quality, pure silica tube, which is mounted in a glass working lathe and heated by a traversing oxyhydrogen torch. A gas phase reaction occurs in the hot zone created by the torch, to produce particles that deposit downstream of the hot zone. The heat from the moving torch sinters this deposit to form dense glass layers. A number of layers of germania and silica soot particles are deposited in this fashion. The cladding layer consists of pure silica.

In all of these vapor deposition processes, the core glass is composed of germania-doped silica, because germania increases the refractive index of the glass. The refractive index increases progressively with germania concentration. The glass used as cladding around the core is usually pure silica, which has a lower refractive index than germania-doped silica. This refractive index difference results in the waveguiding properties of optical fibers. As the difference of refractive indices between clad and core glasses increases, an increasingly higher numerical aperture of the resulting fiber is provided. Many applications in the fiber optics industry require optical fibers having numerical apertures greater than 0.2. Though commercial vapor deposition technologies have produced optical fibers with numerical apertures greater than 0.2, a technology to produce such fibers using a sol-gel process is not yet readily available.

Research has recently been conducted into the use of sol-gel processes for fabricating optical fibers. In such processes, a desired solution, or sol, of glass-forming compounds, solvents and catalysts is poured into a mold and allowed to react. Following hydrolysis and condensation reactions, the sol forms a porous matrix of solids, or gel. With additional time, the gel shrinks in size by expelling fluids from its pores. The wet gel is then dried in a controlled environment, to remove fluid from its pores, and it is then densified into a solid monolithic glass rod.

When optical fibers of high numerical aperture are to be produced, the core glass rod is formed by adding a germania-containing precursor in the sol, in a desired percentage, and the clad tube is formed from pure silica. The germania-containing core glass rod can then be sleeved with the cladding tube, and the fiber can be pulled by heating the ensemble to the glass softening temperature under vacuum. The vacuum forces the sleeve tube to collapse on the core rod at the softening temperature and the fiber draw is then initiated.

Advantages of the sol-gel process include chemical purity and homogeneity, flexibility in the selection of compositions, and processing at relatively low temperatures. By contrast, the vapor deposition processes described earlier are relatively expensive due to a relatively low soot collection efficiency and due to a resultant high investment cost in processing and pollution control equipment. Sol-gel processes have an inherent advantage over the soot deposition processes because glass is formed merely by the mixing of chemicals.

One major problem encountered in producing germania-doped silica glass using a sol-gel process, however, has been severe bubbling encountered when the glass rods are heated to a temperature exceeding 1800° C., for fiber draw. Glasses produced from the vapor deposition processes have not exhibited this behavior. This bubbling tendency becomes progressively worse as the percentage of germania in the glass is increased. However, to manufacture optical fibers having a high numerical aperture, i.e., greater than about 0.2, it is necessary for the core glass to contain germania in at least about 10 mole percent.

Another major problem encountered in producing germania-doped silica glass using a sol-gel process has been premature precipitation of germania powder from the sol. This is believed to be due to the faster reaction rate with water of the germania precursor, tetraethyl orthogermanate, than the silica precursor, tetraethyl orthosilicate. Because of the premature precipitation, a highly non-uniform composition is provided.

Although there have been efforts to eliminate the bubbling and premature precipitation problems, such efforts have not generally succeeded in producing glass with germania concentrations of more than 10 mole percent. It should therefore be appreciated that there is a need for an improved sol-gel process for forming germania-doped silica glass rods that avoids the problem of premature precipitation of germania powder and that provides glass rods that will not bubble when exposed to temperatures exceeding 1800° C., so that optical fibers having numerical apertures greater than about 0.2 can be drawn from such glass rods. The present invention fulfills this need.

SUMMARY OF THE INVENTION

The present invention resides in a sol-gel process for fabricating germania-doped silica glass rods that avoids the problem of premature precipitation of germania powder and that provides rods that will not bubble when heated to their glass softening temperature (e.g., 1800° C.) for a period of time. This result is achieved by preparing three separate solutions which, when mixed together in a particular manner and sequence, provide the desired sol composition. In particular, a first solution is provided by mixing together predetermined quantities of tetraethyl orthosilicate ($(C_2H_5O)_4Si$), tetraethyl orthogermanate ($(C_2H_5O)_4Ge$), and ethyl alcohol or ethanol ($C_2H_5OH$). A second solution is prepare by mixing together predetermined quantities ethanol and deionized water. The second solution is then added dropwise to the first solution, over a prescribed time duration, while stirring continuously with a stirrer. This produces a third solution. A fourth solution is prepared in the meantime by mixing predetermined quantities of a catalyst such as hydrofluoric acid (HF), ethanol, and deionized water. The fourth solution is finally added to the third solution in a dropwise fashion, over a prescribed time duration under continuous stirring. This produces the final sol, which is ready for casting into a mold. The sol prepared in this fashion will not result in premature precipitation of germania powder.

After casting of the sol in a cylindrical mold, a wet porous gel is automatically formed within a few hours. The gel is aged at room temperature for a prescribed time duration, and a solvent exchange process is then performed in which the pore fluid is exchanged with pure ethanol. The solvent exchange process is preferably carried out at least twice, at a temperature in the range of 20° to 55° C., for 24 hours.

The wet gels are next dried to remove the ethanol from the pores, and the dry gel is then ready for sintering into a dense, monolithic glass rod. To prevent the rod from bubbling when exposed to temperatures exceeding 1800° C. for a prolonged time, a careful sintering process must be followed. First, hydroxyl groups must be removed from the dry gel body at an elevated temperature, usually 700° to 1000° C., by exposing it to chlorine for a prescribed time duration. At the end of the chlorine treatment, the gel is treated with a constant flow of 100 percent ultrapure oxygen, for at least 24 hours. This ensures that sufficient chlorine is removed to prevent the chlorine from bubbling when the rod's temperature subsequently is raised to 1800° C., as during a fiber draw step. The oxygen in the pores of the gel body is next replaced by helium, by passing helium through it for a prescribed time duration. The oxygen and helium treatments are preferably performed at about 700° to 1000° C. The final consolidation or sintering is performed under helium flow, by heating the gel to its final consolidation temperature of 1300° C. at a rate of 5° to 15° C. per minute, depending on the percentage of germania in the gel, by holding the gel at 1300° C. for 5 to 10 minutes, and by then cooling the gel to a temperature below 1200° C. at a rate of 5° to 15° C. The gel should not be exposed to a temperature above 1200° C. for more than 30 minutes. The combination of the prolonged oxygenation time and the fast heating rate during the final consolidation solves the bubbling problem in germania-doped silica glasses.

Composition of the sol can be varied considerably by changing the amount of ethanol being added during the sol preparation. Reduction of ethanol content in the sol reduces the average pore size of the gel and increases the surface area. The amount of tetraethyl orthogermanate in the sol does not alter this behavior in any way.

Dry gels prepared with high surface area, i.e., from sol containing less ethanol, tend to shrink at a faster rate when exposed to temperatures exceeding 800° C. Since the dry gel is first treated with chlorine in the temperature range of 700° to 1000° C., followed by oxygenation at 700° to 1000° C., for 24 to 100 hours, it is important that the gel body not shrink prematurely and trap some of these gas bubbles during these treatments. This microstructure variation is unique to sol-gel processing and does not occur in vapor deposition processes.

The germania-doped dense silica glass rod produced by this process can be placed inside a waveguide quality quartz tube. Pulling a vacuum inside the quartz tube and heating the rod and tube ensemble to 1800° C. enables fiber draw to be initiated. Using this process, optical fibers having numerical apertures in the range of 0.1 to 0.4 can be obtained, depending on the percentage of germania in the sol composition.

Other features and advantages of the invention will be apparent from the following description of the preferred processes, taken in conjunction with the accompanying drawings, which illustrate, by way of example, the principles of the invention.

BRIEF DESCRIPTION OF THE DRAWINGS

FIG. 2 is a graph showing the temperature profile followed in the sintering step of the process of Example 1.

DESCRIPTION OF THE PREFERRED PROCESSES

Figure 1:
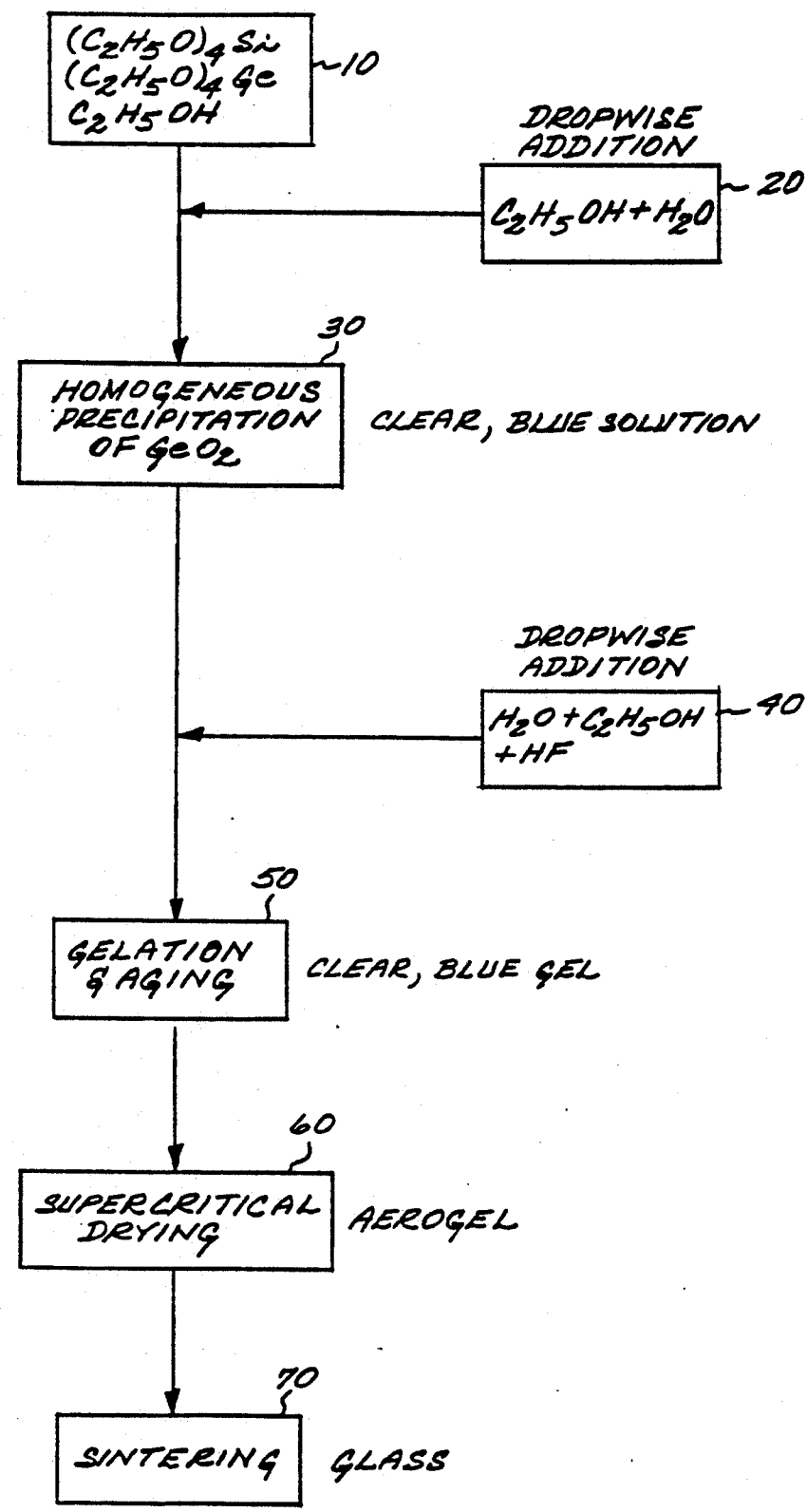
FIG. 1 is a simplified flowchart showing the sequential processing steps following in preparing germania-doped silica glass rods without premature precipitation of germania powder, using tetraethyl orthosilicate and tetraethyl orthogermanate, as precursor compositions.

With reference now to the illustrative drawings, and particularly to FIG. 1, there is depicted a simplified flowchart of an improved sol-gel process for fabricating a germania-doped silica glass rod, which is suitable for use in drawing optical fibers having a relatively high numerical aperture. The process is effective in eliminating premature precipitation of germania powder from the sol and in eliminating bubbling of the rods that had occurred in the past during a subsequent fiber draw step.

In an initial step 10 of the process, alkoxides including tetraethyl orthosilicate ($(C_2H_5O)_4Si$) and tetraethyl orthogermanate ($(C_2H_5O)_4Ge$), along with ethyl alcohol ($C_2H_5OH$), or ethanol, in prescribed relative proportions, are thoroughly mixed to form a first solution. A second solution is formed in step 20, comprising ethanol and deionized water, in prescribed relative proportions. The second solution is then added to the first solution, in step 30, at a controlled, dropwise rate, under continuous stirring, to produce a third solution in which the following hydrolysis reactions occur:

$$(C_2H_5O)_4Si + 4H_2O \rightarrow 4C_2H_5OH + Si(OH)_4$$

$$(C_2H_5O)_4Ge + 4H_2O \rightarrow 4C_2H_5OH + Ge(OH)_4$$

The continuous stirring ensures that the concentrations of silica monomers, $Si(OH)_4$, and germania monomers $Ge(OH)_4$, are uniform throughout the solution.

To polymerize the silica and germania monomers, a further solution is produced, in step 40, which includes deionized water, ethanol and a catalyst, hydrofluoric acid (HF), in prescribed relative proportions. This latter solution is added, in step 50, to the mixture of the first two solutions, at a controlled drop-wise rate, under continuous stirring, to initiate polymerization. The polymerization reactions proceed as follows:

$$Si(OH)_4 \rightarrow SiO_2 + 2H_2O$$

$$Ge(OH)_4 \rightarrow GeO_2 + 2H_2O$$

This final solution is then transferred, still in step 50, to a suitable mold and aged for gelation, which generally occurs within 4 to 5.5 hours. Included in this gelation and aging step is a series of solvent exchange steps that finally yield a fully gelled matrix immersed in ethanol.

The porous gel matrix is then dried, in step 60, using any of a number of suitable techniques. One such technique is described in U.S. Pat. No. 5,023,208, issued to Edward J.A. Pope et al. Another suitable technique is supercritical drying.

After drying, the resulting porous, germania-doped silica gel is sintered, in step 70, to densify it into a clear glass rod suitable for drawing into optical fiber. In the past, because of a high affinity between germanium and hydroxyl ions ($OH^-$), hydroxyl groups have remained in the gel matrix. As a result, when the matrix is sintered, much of these hydroxyl ions seek to escape, in the form of water. Bloating thereby can occur, physically distorting the gel and making it unsuitable for subsequent use as an optical fiber preform. It therefore has been recognized that the hydroxyl ions need to be removed from the gel prior to sintering. This has been accomplished by first chlorinating the dry gel, to substitute chlorine for the hydroxyl groups, followed by oxygenating the chlorinated gel, to substitute oxygen for the chlorine. However, this technique for removing hydroxyl groups has not proven to be entirely successful when used in the sol-gel process. Bubbling continues to be a problem when the germania-doped silica glass rod is raised to its glass softening temperature during the subsequent fiber draw step.

The process of the invention overcomes this bubbling problem by careful attention to the sintering step of the process, including chlorination and oxygenation. In particular, chlorination occurs at a temperature of at least 700° C., for at least one hour, and oxygenation occurs at a temperature of about 700° to 1000° C., for at least about 24 hours. Final densification occurs after a helium purge, at a temperature that remains above 1200° C. for no longer than about 30 minutes. This ensures that very little oxygen leaves the germania due to the decomposition to yield germanium monoxide, which is believed to be a source of the bubbling problem during the subsequent fiber draw.

The process of the invention will be better understood with reference to the following illustrative examples.

EXAMPLE 1

In Example 1, a first solution was prepared by mixing 168.1 grams of tetraethyl orthosilicate (TEOS), 51 grams of tetraethyl orthogermanate (TEOG) and 92.96 grams of ethyl alcohol, or ethanol. This corresponds to a mixture containing 0.8 moles of TEOS, 0.2 moles of TEOG, and 2 moles of ethanol. A second solution was then prepared by mixing 36.32 grams of deionized water with 46.48 grams of ethanol. This corresponds to one mole of water mixed with one mole of ethanol. The second solution was added to the first solution, dropwise at the rate of 20 drops per minute, with continuous stirring, to produce a third solution. A fourth solution containing 1.26 grams of hydrofluoric acid (HF), 36.32 grams of deionized water, and 46.48 grams of ethanol (0.063 moles of HF, 2 moles of deionized water, and 1 mole of ethanol) is then prepared and added to the third solution, dropwise at the rate of 20 drops per minute, again with continuous stirring.

The resulting final solution was homogeneously translucent, without any precipitation, and contained 20 mole percent germania in silica. After 10 minutes of further stirring, the final solution was poured into 250 cc cylindrical molds and held for gelation. The gelation occurred within 4 to 5.5 hours. Gels were first aged at room temperature, for 48 hours, after which the gel was transferred into a 500 cc container filled with pure ethanol, to replace pore liquid with ethanol. This alcohol exchange process was repeated twice at 55° C., for 24 hours.

The wet gel was dried under supercritical conditions of ethanol. In a typical run, the autoclave temperature was at about 250° C., and the pressure was about 1100 to 1200 psi. The monolithic dry gel removed from the autoclave was then heated to a temperature of 400° C, under a flow of air, to burn off residual organics retained on the pore surfaces. The dry gel was then ready for final densification to a germania-doped silica glass.

The densification or consolidation was achieved by placing the dry porous gel inside a tubular furnace. The temperature of the furnace was raised to 800° C., under a continuous flow of helium, at 500 cc per minute. After reaching a temperature of 800° C., gaseous chlorine, at 100 cc per minute, was mixed with the helium, and the chlorination of the dry gel continued for six hours.

At the end of the chlorination, the temperature of the gel was raised to 1000° C., and the gas flow was changed from the helium-chlorine mixture to pure oxygen at 400 cc per minute. The oxygenation process continued for 100 hours, at 1000° C. At the end of the oxygenation step, gas flow was changed back to helium, and the temperature was maintained at 1000° C. for another 5 hours. At the end of this helium purge, the temperature of the gel was raised to 1300° C., at a rate of 15° C. per minute, under the same helium flow rate, and held at 1300° C. for 10 minutes. Thereafter, the gel was cooled to room temperature, at a rate of 15° C. per minute. The result was a dense, germania-containing silica glass rod. A temperature profile of the entire sintering procedure following Example 1 is provided in FIG. 2.

The germania-doped silica glass rod was next inserted into a waveguide-quality pure silica tube. The rod-in-tube assembly was then placed inside a high temperature fiber draw furnace. A vacuum was pulled inside the tube continuously, the temperature of the furnace was raised to 1800° C., and the fiber draw was initiated. The germania-doped silica glass rod did not bubble at all, even though it was exposed to the 1800° C. temperature for 45 minutes. Step index multimode fiber was drawn successfully from the glass rod. The fiber core diameter was 100 microns, and the clad diameter was 140 microns. The numerical aperture of the fiber was measured to be 0.26.

EXAMPLE 2

A dry gel was prepared in exactly the same way as described in Example 1. However, the final densification process differed in that oxygen was substituted for helium in the preheating and chlorination steps. That is, the temperature of the tubular furnace was raised to 800° C., under a continuous flow of oxygen, at 500 cc per minute. After reaching a temperature of 800° C., gaseous chlorine, at 100 cc per minute, was mixed with the oxygen, and chlorination of the dry gel continued for six hours. A dense, monolithic clear glass rod was obtained. When it was exposed to a temperature of 1800° C. for fiber draw, as described in Example 1, the rod did not bubble at all.

EXAMPLE 3

A dry gel was prepared in exactly the same way as described in Example 1. However, the final densification process differed in that the oxygenation time was 6 hours rather than 100 hours, as in Example 1. A dense, monolithic germania-doped silica glass rod was obtained again. However, when fiber draw was attempted by the rod in tube technique described in Example 1, the germania-doped silica glass rod bubbled severely, and fiber draw was not possible.

EXAMPLE 4

A dry gel was prepared in exactly the same way as described in Example 1. However, the final densification process differed in that after oxygenation for 100 hours and helium purge for 5 hours, the heating rate to 1300° C. was 2° C. per minute rather than 15° C. per minute, as in Example 1. A dense, monolithic germania-doped silica glass rod again was obtained. However, when fiber draw was attempted by the rod-in-tube technique described in Example 1, the germania-doped silica glass rod bubbled severely, and fiber draw was not possible.

EXAMPLE 5

A wet gel was prepared in exactly the same way as described in Example 1, except that the first solution used in sol mixing included 189.8 grams of TEOS (0.9 mole), 25.5 grams of TEOG (0.1 mole), and 92.96 grams of ethanol (2 moles). The remaining processing steps for densification to clear glass also were the same as in Example 1, except that the oxygenation time during final sintering was limited to 50 hours and, after helium purge for 5 hours at 1000° C., the heating rate to 1300° C. was 5° C. per minute. A dense, monolithic clear glass rod was obtained. When it was exposed to a temperature of 1800° C. as a rod-in-tube ensemble for fiber draw, as described in Example 1, the germania-doped silica rod did not bubble at all. Step index multimode fiber was drawn successfully with a core diameter of 100 microns and a clad diameter of 140 microns. The numerical aperture of the fiber was measured to be 0.15.

EXAMPLE 6

A wet gel was prepared in exactly the same way as described in Example 5. The remaining processing steps for densification to clear glass also were the same, except that the oxygenation time during final sintering was limited to six hours. A dense, monolithic clear glass rod was obtained. However, when fiber draw was attempted by the rod-in-tube technique as described in Example 1, the germania-doped silica glass rod bubbled severely, and fiber draw was not possible.

EXAMPLE 7

A wet gel was prepared in exactly the same way as described in Example 5. The remaining processing steps for densification to clear glass also were the same, except that during final sintering, the heating rate to 1300° C. was limited to 2° C. per minute. A dense, monolithic clear glass rod was obtained. However, when fiber draw was attempted by the rod-in-tube technique at 1800° C., as described in Example 1, the germania-doped silica glass rod bubbled severely, and fiber draw was not possible.

EXAMPLE 8

In Example 8, first and second solutions identical to those of Example 1 were prepared. Rather than adding the second solution dropwise to the first solution as described in Example 1, however, the entire volume of the second solution was added to the first solution instantaneously. Germania powder precipitated out of the mixed solution immediately, and preparing a clear wet gel was not possible.

EXAMPLE 9

In Example 9, first and second solutions identical to those of Example 1 were prepared and mixed together in the same dropwise fashion to produce a clear, third solution. A fourth solution identical to that of Example 1 also was prepared and added instantaneously to the third solution, rather than in the dropwise fashion of Example 1. Germania powder immediately precipitated out of the solution, and preparing a clear wet gel was not possible.

EXAMPLE 10-12

In Examples 10-12, germania-containing wet gel samples were prepared using the same processing steps as described in Example 1, except that the ethanol content of the final sol was varied as shown in Table 1 below. Hydrofluoric acid was used as a catalyst. The variation in ethanol concentration affects the speeds of the hydrolysis and condensation reactions, which in turn affects the average pore size and average surface area of the resulting gel. This is evident in Table II below. These gels, after drying and densification, yielded 10 mole percent germania-doped silica glass rods. In the chlorination portion of the sintering step, the temperature in each example was maintained at 800° C. However, in the oxygenation portion of the process, which had a time duration of 100 hours, the temperature needed to be selected to avoid premature shrinkage and trapping of chlorine or oxygen gas bubbles, as set forth in Table II below. It will be appreciated that the oxygenation temperature needs to be lower if the average pore size is lower.

TABLE I

|  | TEOS | TEOG | Ethanol | Water |  |
|---|---|---|---|---|---|
| Ex. 10: | 211.35 | 28.50 | 155.86 | 81.19 | Grams |
|  | 0.9 | 0.1 | 3 | 4 | Moles (Rel.) |
| Ex. 11: | 233.61 | 31.51 | 114.85 | 89.75 | Grams |
|  | 0.9 | 0.1 | 2 | 4 | Moles (Rel.) |
| Ex. 12: | 255.88 | 34.51 | 68.90 | 98.30 | Grams |
|  | 0.9 | 0.1 | 1 | 4 | Moles (Rel.) |

TABLE II

|  | Average Pore Radius, Angstroms | Average Surface Area, m$^2$/gram | Oxygenation Temp. °C. |
|---|---|---|---|
| Ex. 10: | 170 | 600 | 1000 |
| Ex. 11: | 120 | 800 | 950 |
| Ex. 12: | 50 | 1200 | 900 |

Oxygenation under these temperature conditions for different compositions allowed the gas treatments to be performed with no more than 15 percent shrinkage from the original dry gel dimensions.

EXAMPLES 13-15

In examples 13-15 germania-containing wet gel samples were prepared using the same processing steps as described in Example 1, except that the ethanol content of the final sol was varied as shown in Table III below. Hydrofluoric acid was used as a catalyst. As in Examples 10-12, the variation in ethanol concentration affects the speeds of the hydrolysis and condensation reactions, which in turn affects the average pore size and average surface area of the resulting gel. This is evident in Table IV below. These gels, after drying and densification yielded 20 mole percent germania-doped silica glass rods. In the chlorination portion of the sintering process, the temperature in each example was maintained at 800° C. However, in the oxygenation portion of the process, which had a time duration of 100 hours, the temperatures needed to be selected to avoid premature shrinkage and trapping of chlorine or oxygen gas bubbles, as set forth in Table IV below. In accord with the results of Examples 10-12, the oxygenation temperature needs to be lower if the average pore size is lower.

TABLE III

|  | TEOS | TEOG | Ethanol | Water |  |
|---|---|---|---|---|---|
| Ex. 13: | 187.90 | 57.01 | 155.86 | 81.19 | Grams |
|  | 0.8 | 0.2 | 3 | 4 | Moles (Rel) |
| Ex. 14: | 207.69 | 63.01 | 114.85 | 89.75 | Grams |
|  | 0.8 | 0.2 | 2 | 4 | Moles (Rel) |
| Ex. 15: | 227.49 | 69.02 | 62.90 | 98.30 | Grams |
|  | 0.8 | 0.2 | 1 | 4 | Moles (Rel) |

TABLE IV

|  | Average Pore Radius, Angstroms | Average Surface Area, m$^2$/gram | Oxygenation Temp. °C. |
|---|---|---|---|
| Ex. 13: | 160 | 650 | 1000 |
| Ex. 14: | 125 | 825 | 950 |
| Ex. 15: | 45 | 1255 | 900 |

Oxygenation under those temperature conditions for different compositions allowed the gas treatments to be performed with no more than 15 percent shrinkage from the original gel dimensions.

It should be appreciated from the foregoing description that the present invention provides an improved sol-gel process for producing germania-doped clear glass silica rods that are suitable for use in producing optical fiber of high numerical aperture. Carefully mixing the germania and silica precursors with deionized water, ethanol, and a catalyst, in prescribed relative proportions and in a prescribed sequence ensures that germania powder does not precipitate prematurely from the initial sol. Further, densification occurs only after the dry gel has been chlorinated and oxygenated, and it occurs by raising the gel's temperature above 1200° C. for no more than about 30 minutes. This ensures that the resulting clear glass rod does not bubble during a subsequent fiber draw step.

Although the invention has been described with reference only to the presently preferred processes, those of ordinary skill in the art will appreciate that various modifications can be made without departing from the invention. Accordingly, the invention is defined only by the following claims.

We claim:

1. A process for forming a germania-doped silica glass rod, comprising the steps of:
    forming a first solution of tetraethyl orthosilicate, tetraethyl orthogermanate, and ethanol in selected relative proportions, wherein the molar ratio of tetraethyl orthosilicate to tetraethyl orthogermanate in the first solution is equal to or less than 9:1;
    forming a second solution of ethanol and deionized water;
    adding the second solution to the first solution at a selected controlled rate, under continuous stirring, to form a third solution in which hydrolysis of the silicon and germanium of the first solution is initiated;
    forming a fourth solution of ethanol, deionized water, and a catalyst comprising hydrofluoric acid;
    adding the fourth solution to the third solution at a selected controlled rate, under continuous stirring, to form a fifth solution in which condensation of the hydrolyzed silicon and geranium is initiated, thereby producing a wet gel matrix having an average pore radius of at least about 45 Angstroms, the matrix including hydroxyl groups;
    exchanging ethanol for fluid in the pores of the wet gel while maintaining the wet gel at a temperature in the range of about 20° C. to about 55° C. for about 24 hours;
    drying the wet gel matrix under supercritical conditions of ethanol by heating the wet gel to a temperature of about 250° C. at a pressure of about 1100 to about 1200 psi;
    chlorinating the dried gel matrix by exposing the dry gel to a gaseous mixture of chlorine and either helium, oxygen, or helium and oxygen, for about at least one hour, at a temperature of at least about 700° C.;
    oxygenating the chlorinated gel matrix by exposing the chlorinated gel to substantially pure gaseous oxygen for at least about 24 hours, at a temperature of at least about 700° C.;
    purging the oxygenated gel matrix by exposing the oxygenated gel to gaseous helium for at least about five hours, at a temperature of at least about 700° C.; and
    densifying the oxygen-purged gel matrix by raising the temperature of the oxygenated gel at a rate of at least about 5° C. per minute, maintaining the oxygenated gel at a temperature greater than 1200° C. for a time duration of less than about 30 minutes, and then lowering the temperature of the oxygenated gel at a rate of at least about 5° C. per minute.

2. A process as defined in claim 1, wherein the second solution is added to the first solution at a selected drop-wise rate, and the fourth solution is added to the third solution at a selected drop-wise rate.

3. A process as defined in claim 2, wherein:
    the first solution includes one mole of tetraethyl orthosilicate and tetraethyl orthogermanate, and two moles of ethanol;
    the second solution includes one mole of ethanol and one mole of water;
    the second solution is added to the first solution at a rate of about 20 drops per minute;
    the fourth solution includes one mole of ethanol, two moles of deionized water, and about one-twelfth mole of hydrofluoric acid; and
    the fourth solution is added to the third solution at a rate of about 20 drops per minute.

4. A process as defined in claim 1, wherein the step of exchanging is carried out at least twice.

5. A process for forming a germania-doped silica glass rod, comprising the steps of:
   forming a first solution of tetraethyl orthosilicate, tetraethyl orthogermanate, and ethanol, in selected relative proportions;
   forming a second solution of ethanol and deionized water;
   adding the second solution to the first solution at a selected controlled rate, under continuous stirring, to form a third solution in which hydrolysis of the silicon and germanium of the first solution is initiated;
   forming a fourth solution of ethanol, deionized water, and a catalyst comprising hydrofluoric acid;
   adding the fourth solution to the third solution at a selected controlled rate, under continuous stirring, to form a third solution in which hydrolysis of the silicon and germanium of the first solution is initiated;
   forming a fourth solution of ethanol, deionized water, and a catalyst comprising hydrofluoric acid;
   adding the fourth solution to t he third solution at a selected controlled rate, under continuous stirring, to form a fifth solution in which condensation of the hydrolyzed silicon and germanium is initiated, thereby producing a wet gel matrix having a selected average pore size, the matrix including hydroxyl groups;
   exchanging ethanol for fluid in the pores of the wet gel;
   drying the wet gel matrix under supercritical conditions of ethanol;
   chlorinating the dried gel matrix by exposing it to gaseous chlorine at a selected temperature for a selected time duration to substitute chlorine for the hydroxyl groups;
   oxygenating the chlorinated gel matrix by exposing it to gaseous oxygen at a selected temperature for a selected time duration to substitute oxygen for the chlorine;
   purging the oxygenated gel matrix of gaseous oxygen at a selected temperature for a selected time duration; and
   densifying the oxygen-purged gel matrix at a temperature about 120-0° C. for a time duration sufficiently long to densify the matrix into a clear, germania-doped silica glass rod, but sufficiently short to ensure that the glass rod subsequently can be raised in temperature to its softening point without causing it to bubble.

6. A process as defined in claim 5, wherein the molar ratio of tetraethyl orthosilicate to tetraethyl orthogermanate in the first solution is equal to or less than 9:1.

7. A process as defined in claim 5, wherein: p1 the step of chlorinating includes a step of exposing the dry gel to a gaseous mixture of chlorine and either helium, oxygen or helium and oxygen, for at least about one hour, at a temperature of at least about 700° C.

the step of oxygenating includes a step of exposing the chlorinated gel to substantially pure gaseous oxygen for at least about 24 hours, at a temperature of at least about 700° C.; and
the step of purging includes a step of exposing the oxygenated gel to gaseous helium for at least about five hours, at a temperature of at least about 700° C.

8. A process as defined in claim 5, wherein the step of densifying includes a step of maintaining the oxygenated gel at a temperature greater than 1200° C. for a time duration of less than about 30 minutes.

9. A process as defined in claim 8, wherein the step of densifying further includes a step of raising the temperature of the oxygenated gel at a rate of at least about 5° C. per minute, followed by a step of lowering the temperature of the oxygenated gel at a rate of at least about 5° C. per minute.

10. A process as defined in claim 5, wherein the selected temperatures and time durations of the chlorinating, oxygenating, and purging steps are selected to ensure that the gel matrix shrinks by no more than 15 percent.

11. A process as defined in claim 5, wherein the second solution is added to the first solution at a selected drop-wise rate, and the fourth solution is added to the third solution at a selected drop-wise rate.

12. A process as defined in claim 5, wherein the step of purging the oxygenated gel matrix of gaseous oxygen includes exposing the oxygenated gel matrix to gaseous helium.

13. A process as defined in claim 5, wherein the wet gel matrix has an average pore radius of at least about 45 Angstroms.

14. A process as defined in claim 5, wherein the step of drying the wet gel matrix under supercritical conditions of ethanol includes heating the wet gel to a temperature of about 250° C. at a pressure of about 1100 to about 1200 psi.

15. A process as defined in claim 5, wherein the step of exchanging is carried out at a temperature in the range of about 20° C. to about 55° C. for about 24 hours.

16. A process as defined in claim 5, wherein the step of exchanging is carried out at least twice.

17. A process as defined in claim 5, wherein the step of oxygenating includes exposing the wet gel to a constant flow of 100 percent, ultra pure oxygen for at least 24 hours.

18. A process as defined in claim 11, wherein:
   the first solution includes one mole of tetraethyl orthosilicate and tetraethyl orthogermanate, and two moles of ethanol;
   the second solution includes one mole of ethanol and one mole of water;
   the second solution is added to the first solution at a rate of about 20 drops per minute;
   the fourth solution includes one mole of ethanol, two moles of deionized water, and about one-twelfth mole of hydrofluoric acid; and
   the fourth solution is added to the third solution at a rate of about 20 drops per minute.

* * * * *

UNITED STATES PATENT AND TRADEMARK OFFICE
CERTIFICATE OF CORRECTION

PATENT NO. : 5,254,508

DATED : October 19, 1993

INVENTOR(S) : Fikret Kirkbir and Satyabrata Raychaudhuri

It is certified that error appears in the above-identified patent and that said Letters Patent is hereby corrected as shown below:

Column 11, delete lines 19-25.

Column 11, line 48, change "120-0°C" to --1200°C--.

Column 11, line 57, delete "p1".

Column 11, line 61, change "C." to --C.;--.

Signed and Sealed this

Eighteenth Day of April, 1995

Attest:

BRUCE LEHMAN

*Commissioner of Patents and Trademarks*

*Attesting Officer*